(12) United States Patent
Tang et al.

(10) Patent No.: US 12,517,293 B2
(45) Date of Patent: Jan. 6, 2026

(54) DISPLAY DEVICE AND ELECTRONIC APPARATUS

(71) Applicant: HKC CORPORATION LIMITED, Shenzhen (CN)

(72) Inventors: Rong Tang, Shenzhen (CN); Haijiang Yuan, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 508 days.

(21) Appl. No.: 18/086,624

(22) Filed: Dec. 21, 2022

(65) Prior Publication Data

US 2023/0341600 A1      Oct. 26, 2023

(30) Foreign Application Priority Data

Apr. 25, 2022   (CN) .......................... 202210438685.2

(51) Int. Cl.
G02B 5/30      (2006.01)

(52) U.S. Cl.
CPC .................................... G02B 5/305 (2013.01)

(58) Field of Classification Search
CPC ...... G02B 5/30; G02B 5/3025; G02B 5/3033; G02B 5/3041; G02B 5/305; G02B 26/00; G02B 26/02; G02B 26/026; G02B 27/28; G02B 27/281; G02B 27/286; G02B 27/288; G02F 1/0081; G02F 1/009; G02F 1/01; G02F 1/0102; G02F 1/0128; G02F 1/0136; G02F 1/0139; G02F 1/0147; G02F 1/132; G02F 1/133528
See application file for complete search history.

(56) References Cited

U.S. PATENT DOCUMENTS 11,048,118 B1 *    6/2021    Liu .................... G02F 1/133531
2024/0036362 A1 *  2/2024    Zhang .................... G02F 1/0136

FOREIGN PATENT DOCUMENTS

WO       WO-2022116776 A1 *   6/2022    ........... G02F 1/0136

* cited by examiner

*Primary Examiner* — Stephone B Allen
*Assistant Examiner* — Adam W Booher

(57) ABSTRACT

A display device and an electronic apparatus are disclosed. The display device includes a display panel, and a first polarizer and a second polarizer that are respectively arranged on both sides of the display panel. A light admission hole is defined in at least one of the first polarizer and the second polarizer and disposed corresponding to the camera. The display device further includes at least one orientation release structure arranged corresponding to the light admission hole. A linear memory structure is transfer-printed to the orientation release structure at the position corresponding to the light hole. When the orientation release structure is not working, the linear memory structures are regularly arranged to form oriented slits. When the orientation release structure is working, the linear memory structures release the oriented slit.

18 Claims, 4 Drawing Sheets

DISPLAY DEVICE AND ELECTRONIC APPARATUS

CROSS-REFERENCE TO RELATED APPLICATIONS

This application claims the priority and benefit of Chinese patent application 2022104386852, titled "Display Device and Electronic Apparatus" and filed Apr. 25, 2022, with China National Intellectual Property Administration, the entire contents of which are incorporated herein by reference.

TECHNICAL FIELD

The present application relates to the field of display technology, and in particular, to a display device and an electronic apparatus.

BACKGROUND

The description provided in this section is intended for the mere purpose of providing background information related to the present application but doesn't necessarily constitute prior art.

With the development of technology, the demand for screen-to-body ratio of mainstream display devices in the market is getting higher and higher. Supplying products with a higher screen-to-body ratio to the market can improve the technical competitiveness of the products. Therefore, the camera is made hidden under the display screen, which makes the bezel of the display device narrower, so that the screen ratio is higher, and the appearance is more beautiful. However, due to the influence of the polarizers, the loss of light transmittance is relatively large, which will directly affect the imaging effect during photography.

In the related art, the polarizers at the corresponding position of the camera may be removed to ensure the imaging effect during photography, but the camera cannot be hidden in this way, and the screen cannot display normally when the camera is being used.

SUMMARY

It is therefore a purpose of the present application to provide a display device and an electronic apparatus, which can increase the amount of incoming light of the camera when using the camera, ensure the imaging effect when the camera is used, and can hide the camera when the camera is not used to ensure the normal display of the picture.

The present application discloses a display device. The display device includes a display panel, a first polarizer and a second polarizer. The first polarizer is arranged on the side of a light-emitting surface of the display panel. The second polarizer is arranged on the side of a light incident surface of the display panel. The first polarizer and/or the second polarizer is provided with a light admission hole corresponding to the camera. The display device further includes at least one orientation release structure and a plurality of linear memory structures. The orientation release structure is arranged corresponding to the light admission hole, and is located on the same side of the display panel as the light admission hole. The plurality of the linear memory structures are arranged corresponding to the orientation release structure, and correspond to the position of the light admission hole. When the orientation release structure is not working, the plurality of the linear memory structures are regularly arranged to form an oriented slit. When the orientation release structure is working, the plurality of linear memory structures release the oriented slit.

Optionally, the light admission hole is defined in the first polarizer or the second polarizer. When the light admission hole is defined in the first polarizer, the oriented state in which the plurality of linear memory structures are regularly arranged to form the oriented slit is consistent with the oriented state of the first polarizer. When the light admission hole is defined in the second polarizer, the oriented state in which the plurality of linear memory structures are regularly arranged to form the oriented slit is consistent with the oriented state of the second polarizer.

Optionally, the orientation release structure and the linear memory structures are stacked and disposed in the light admission hole, and the sum of the thickness of the orientation release structure and the thickness of the linear memory structures is equal to the thickness of the light admission hole.

Optionally, both the first polarizer and the second polarizer are each provided with the light admission hole. The light admission hole in the first polarizer and the light admission hole on the second polarizer are arranged correspondingly and oppositely. The display device includes two of the orientation release structures. One of the orientation release structures is arranged on the side of the display panel away from the first polarizer, and is arranged corresponding to the light admission hole in the second polarizer. The other one of the orientation release structures is arranged on the side of the display panel away from the second polarizer, and is arranged corresponding to the light admission hole in the first polarizer. When the two orientation release structures are not in operation, the oriented slit formed by the regular arrangement of the linear memory structures disposed on the side of the display panel away from the second polarizer is perpendicular to the oriented slit formed by the regular arrangement of the linear memory structures disposed on the side of the display panel away from the first polarizer.

Optionally, the oriented state of the oriented slits formed by the regular arrangement of the linear memory structures disposed on the side of the display panel away from the second polarizer is consistent with the oriented state of the first polarizer. The oriented state of the oriented slits formed by the regular arrangement of the linear memory structures disposed on the side of the display panel away from the first polarizer is consistent with the oriented state of the second polarizer.

Optionally, the disoriented structure includes a transparent electrothermal film and a first electrode and a second electrode. The first electrode and the second electrode are arranged opposite to each other, and surround the transparent electrothermal film in the circumferential direction. The linear memory structures are arranged on the surface of the transparent electrothermal film. When the first electrode and the second electrode heat the linear memory structure through the transparent electrothermal film, the linear memory structures bend to release the oriented slit.

Optionally, the surface of the transparent electrothermal film is provided with fixing grooves, and the linear memory structures are respectively arranged in the fixing grooves.

Optionally, the display device further includes a heat insulation film, and the heat insulation film is disposed on the side of the linear memory structure away from the orientation release structure.

Optionally, the linear memory structure is made of at least one material selected from titanium-nickel-copper alloy, titanium-nickel-iron alloy, titanium-nickel-chromium alloy, nickel-aluminum alloy, iron-manganese-silicon alloy, and copper-zinc alloy.

The present application further discloses an electronic device, the electronic device includes a camera and the above-mentioned display device, wherein the camera is arranged corresponding to the light admission hole in the display device.

Compared with the solution of directly opening a hole at the position of the polarizers corresponding to the camera so that the camera can obtain enough light from outside the display panel, in the present application, the light admission hole is first set at the position corresponding to the camera of the polarizers, and then a linear memory structure and an orientation release structure are arranged at the position corresponding to the light admission hole. When the user is not using the camera, the linear memory structures are regularly arranged to form oriented slits, which act as a polarizer. When the user turns on the camera, the shape memory is controlled by the orientation release structure to release the oriented slits, and so the linear memory structures don't act as a polarizer, and the controllable operation of the polarization function of the linear memory structures is realized.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

In the description of this application, the terms "first" and "second" are merely used for description purposes, and cannot be understood as indicating relative importance, or implicitly indicating the number of indicated technical features. Thus, unless otherwise specified, features defined as "first" and "second" may expressly or implicitly include one or more of the features; "plurality" means two or more. The terms "including", "comprising", and any variations thereof are intended to mean a non-exclusive inclusion, namely one or more other features, units, components and/or combinations thereof may be present or added.

The present application will be described in detail below with reference to the accompanying drawings and optional embodiments.

Figure 1:
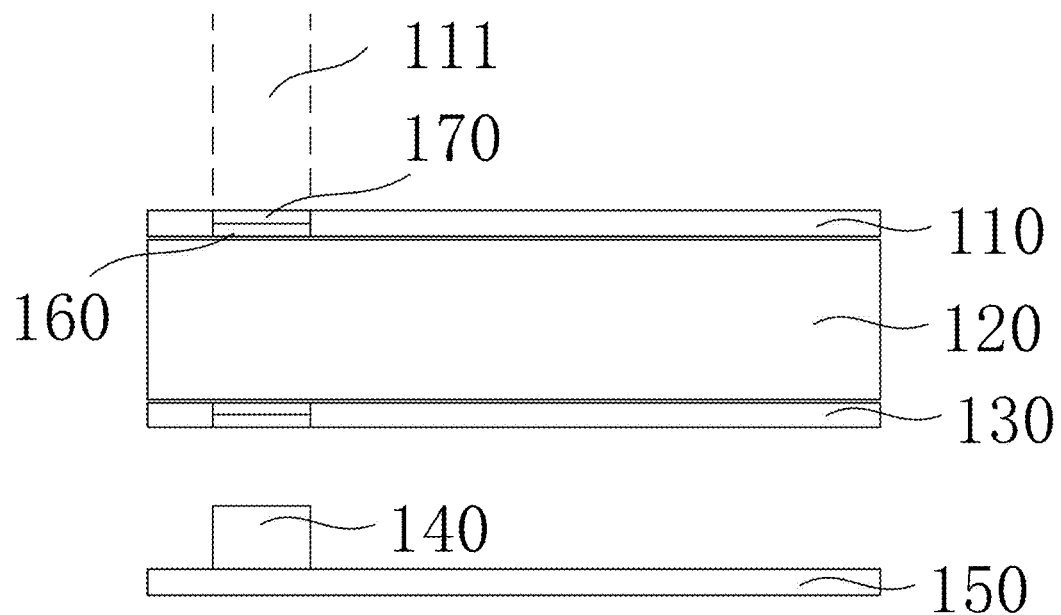
FIG. 1 is a schematic diagram of an electronic device according to an embodiment of the present application.
Figure 2:
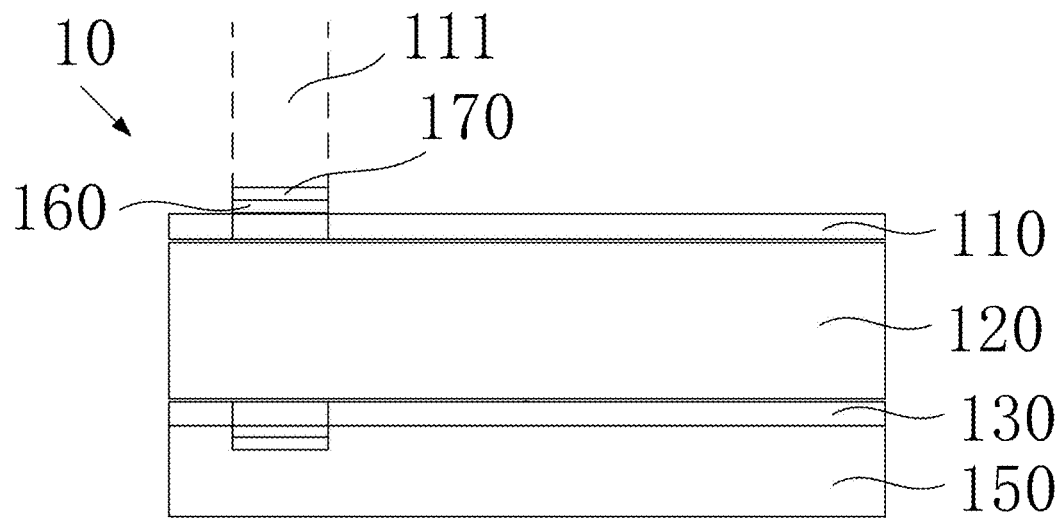
FIG. 2 is a schematic diagram of a display device according to an embodiment of the present application.

FIG. 1 is a schematic diagram of an electronic device according to an embodiment of the present application. As shown in FIG. 1, an electronic apparatus is disclosed, including a display device and a camera. The camera is arranged in the display device, and is arranged corresponding to the light admission hole in the display device. This application only improves the display device. The camera is arranged between the second polarizer and the backlight module of the display device as an example for illustration, specifically:

FIG. 2 is a schematic diagram of a display device according to an embodiment of the present application. As shown in FIG. 2, the present application discloses a display device 10. The display device 10 includes a display panel 120, a first polarizer 110, a second polarizer 130 and a backlight module 150. The first polarizer 110 is disposed on the side of the light-emitting surface of the display panel 120. The second polarizer 130 is arranged on the side of the light incident surface of the display panel 120. That is, the first polarizer 110 and the second polarizer 130 are attached to the upper and lower surfaces of the display panel 120, respectively. The camera 140 is arranged between the second polarizer 130 and the backlight module 150. That is, the first polarizer 110, the display panel 120, the second polarizer 130, the camera 140 and the backlight module 150 are arranged in sequence.

The first polarizer 110 and/or the second polarizer 130 is provided with a light admission hole 111 at a position corresponding to the camera 140, and light from the outside enters the display device 10 through the light admission hole 111 and is transmitted to the camera 140. The display device 10 further includes at least one orientation release structure 170 and a plurality of linear memory structures 160. The orientation release structure 170 is disposed corresponding to the light admission hole 11, and is located on the same side of the display panel 120 as the light admission hole 111. The plurality of linear memory structures 160 are disposed corresponding to the orientation release structure 170 and corresponding to the position of the light admission hole 111. When the orientation release structure 170 is not working, the plurality of the linear memory structures 160 are regularly arranged to form an oriented slit. When the orientation release structure 170 is working, the plurality of linear memory structures 160 release or get rid of the oriented slits.

That is, when the orientation release structure 170 is not working, the linear memory structures 160 are regularly arranged to form an oriented slit. The formed oriented slit is equivalent to a grating, and among the light passing through the linear memory structures 160, the light wave perpendicular to the oriented slit will be filtered. At this time, the linear memory structures 160 act as a grating to form polarized light. In the operating state of the orientation release structure 170, the orientation release structure 170 can perform heating or electromagnetic operation on the linear memory structures 160, so that the arrangement and bending of the linear memory structures 160 become disordered, so that the oriented slit is removed or released. At this time, the linear memory structure 160 loses the function as the grating.

The linear memory structure 160 is made of at least one selected from the group of the following materials: titanium-nickel-copper alloy, titanium-nickel-iron alloy, titanium-nickel-chromium alloy, nickel-aluminum alloy, iron-manganese-silicon alloy, and copper-zinc alloy. The orthographic projection area of the light admission hole 111 is larger than that of the camera 140, and the ratio is 1:1.2. Of course, the orthographic projection area of the light admission hole 111 may also be equal to the orthographic projection area of the camera 140.

Compared with the solution of directly opening a hole at the position of the polarizer corresponding to the camera 140 so that the camera 140 can obtain enough light from outside the display panel 120, in the present application, a hole, namely the is first opened at the position of the polarizer corresponding to the camera 140, the light admission hole 111, then the linear memory structures 160 and the orientation release structure 170 are imprinted at the position corresponding to the light admission hole 111, and the orientation release structure 170 controls the shape memory to release the oriented slit, so as to realize the controllable operation of the polarization function of the linear memory structures 160. When the user is not using the camera 140, the linear memory structures 160 are regularly arranged. When the camera 140 is turned on when the user needs to use the camera 140, the orientation release structure 170 starts to operate the linear memory structures 160, so that the linear memory structures 160 achieves the release or removal of the oriented slit.

The linear memory structures 160 and the orientation release structure 170 can be arranged in the light admission hole 111. The thickness sum of the linear memory structures 160 and the orientation release structure 170 is equal to that of the respective polarizer, which ensures the flatness of the polarizer. Of course, the linear memory structures 160 and the orientation release structure 170 can also be arranged in the same vertical direction as the light admission hole 111, that is, above or below the light admission hole 111.

Further, when the light admission hole 111 is in the first polarizer 110, the oriented state in which the linear memory structures 160 are regularly arranged to form the oriented slit is consistent with the oriented state of the first polarizer 110. When the light admission hole 111 is in the second polarizer 130, the oriented state in which the linear memory structures 160 are regularly arranged to form the oriented slit is consistent with the oriented state of the second polarizer 130.

In this way, the oriented state of the linear memory structures 160 is consistent with the oriented state of the polarizer corresponding to the linear memory structure 160. It can be understood that, taking the grating type polarizer as an example, the linear memory structures 160 are regularly arranged to form the oriented slit, and the direction of the oriented slit is consistent with the direction of the oriented slit on the polarizer corresponding to the linear memory structures 160. In this way, there is no need to separately adjust the liquid crystal rotation corresponding to the linear memory structures 160, which ensures the consistency of the picture and does not affect the display effect of the display panel 120.

The light admission hole 111 may be defined in the first polarizer 110 or on the second polarizer 130. Accordingly, the corresponding linear memory structures 160 and the orientation release structure 170 can be arranged in the light admission hole 111 of the first polarizer 110, and can also be arranged in the light admission hole 111 of the second polarizer 130. When the orientation release structure 170 and the linear memory structures 160 are stacked in the light admission hole, the sum of the thickness of the orientation release structure 170 and the thickness of the linear memory structures 160 is equal to the thickness of the light admission hole 111, to ensure the flatness of the polarizer.

Figure 3:
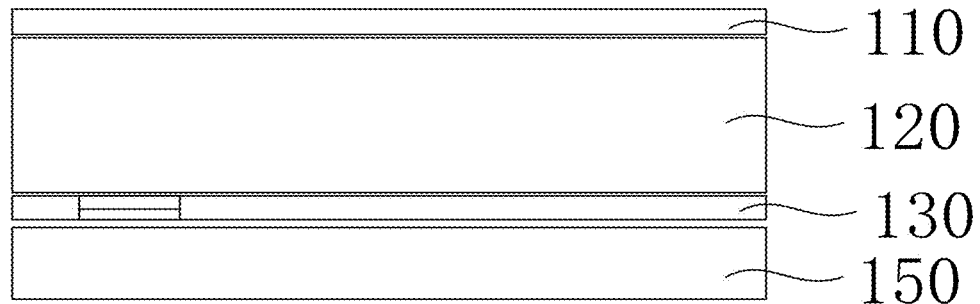
FIG. 3 is a schematic diagram of a light admission hole defined in a second polarizer according to an embodiment of the present application.

As shown in FIG. 3, the light admission hole 111 is only provided in the second polarizer 130. That is, the linear memory structures 160 and the orientation release structure 170 are arranged on the same side as the second polarizer 130. Since the first polarizer 110 corresponds to one side of the light-emitting surface of the display panel 120, if the linear memory structures 160 and the orientation release structure 170 are arranged on the same side as the first polarizer, the user can directly observe them. On the other hand, the linear memory structures 160 and the orientation release structure 170 are arranged in the second polarizer 130, which is located between the display panel 120 and the backlight module 150, and the second polarizer 130 is provided with a hole and the linear memory structure 160 and the orientation release structure 170 are arranged in the hole and are so not easily noticed by the user, and no obvious alteration marks can be seen on the display panel 120, so that the display panel 120 is more beautiful.

Of course, the light admission hole 111 may also be disposed in both the second polarizer 130 and the first polarizer 110.

The first polarizer 110 is provided with a light admission hole 111, and the second polarizer 130 is also provided with a light admission hole 111. The light admission hole 111 in the first polarizer 110 and the light admission hole 111 in the second polarizer 130 are correspondingly and oppositely arranged. The display device 10 includes two linear memory structures 160 and two orientation release structures 170. One of the linear memory structures 160 and one of the orientation release structures 170 are arranged on the side of the display panel 120 away from the first polarizer 110, and are arranged correspondingly in the light admission hole 111 in the second polarizer 130. Another linear memory structure 160 and another orientation release structure 170 are disposed on the side of the display panel 120 away from the second polarizer 130, and are correspondingly disposed in the light admission hole 111 on the first polarizer 110. When the two linear memory structures 160 are not in operation, the oriented slit formed by the regular arrangement of the linear memory structure 160 disposed on the side of the display panel 120 away from the second polarizer 130 is perpendicular to the oriented slit formed by the regular arrangement of the linear memory structure 160 disposed on the side of the display panel 120 away from the first polarizer 110.

Light admission holes 111 are opened at the positions of the camera 140 corresponding to the first polarizer 110 and the second polarizer 130 at the same time, and both the light admission hole 111 in the first polarizer 110 and the light admission hole 111 in the second polarizer 130 are each provided the linear memory structure 160 and the orientation release structure 170. In the state where the orientation release structure 170 is not in operation, the display device 10 has better shading properties corresponding to the position of the camera 140, and the outside light will not enter the display panel 120 through the light admission holes 111. In the working state of the orientation release structures 170, the linear memory structures 160 corresponding to the positions of the first polarizer 110 and the second polarizer 130 at the camera 140 both get rid of the oriented slits and do not function as polarizers, and the camera 140 can receive more light from the outside world.

Further, the oriented state of the oriented slit formed by the regular arrangement of the linear memory structure 160 disposed on the side of the display panel 120 away from the second polarizer 130 is consistent with the oriented state on the first polarizer 110. The oriented state of the oriented slit formed by the regular arrangement of the linear memory structure 160 disposed on the side of the display panel 120 away from the first polarizer 110 is consistent with the oriented state of the second polarizer 130. In this way, there is no need to change the driving on the display panel 120 corresponding to the linear memory structure 160, and local display differences will not be caused.

Figure 4:
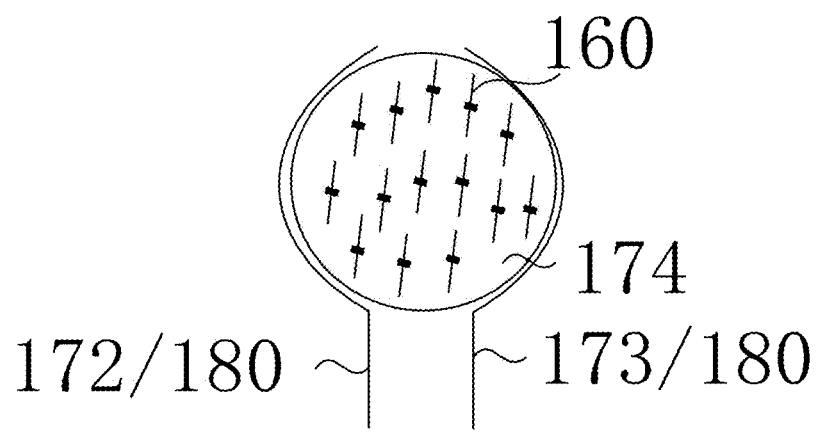
FIG. 4 is a schematic diagram of an orientation release structure not in operation according to an embodiment of the present application.
Figure 5:
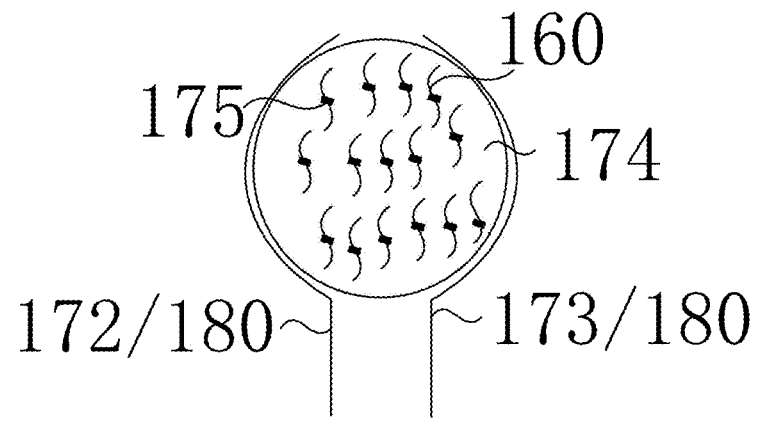
FIG. 5 is a schematic diagram of an orientation release structure in operation according to an embodiment of the present application.

As shown in FIGS. 4 and 5, the orientation release structure 170 includes a heating structure 171. In the working state of the alignment releasing device 170, the heating structure 171 heats the linear memory structure 160 to bend the linear memory structure 160, thereby removing or releasing the oriented slit of the linear memory structure 160. Specifically, the heating structure 171 includes a transparent electrothermal film 174, and a first electrode 172 and a second electrode 173 arranged on both sides of the transparent electrothermal film 174. The linear memory structure 160 is transfer printed on the surface of the transparent electrothermal film 174. The first electrode 172 and the second electrode 173 are arranged opposite to each other and used to heat the transparent electrothermal film 174. When the first electrode 172 and the second electrode 173 heat the linear memory structure 160 through the transparent electrothermal film 174, the linear memory structure 160 releases the oriented slit.

The material of the transparent electrothermal film 174 includes at least one material selected from polyethylene terephthalate, transparent graphene film, and polycarbonate. The surface of the transparent electrothermal film 174 further includes a fixing groove 175. The linear memory structure 160 is arranged in the fixing groove 175, and the linear memory structure 160 is fixed through the fixing groove 175. The material of the fixing groove 175 is identical with that of the transparent electrothermal film 174, so it will not affect or block light and it will also not affect the conduction of heat.

The first electrode 172 and the second electrode 173 heat the transparent electrothermal film 174, and the heat of the transparent electrothermal film 174 is transfer-printed to the linear memory structure 160. When the temperature reaches more than 45 degrees, the linear memory structure 160 goes from the state of being regularly arranged as a straight strip-like structure to form the oriented slit to the state of becoming curved to release the oriented slit. When the user turns off the camera 140, the first electrode 172 and the second electrode 173 stop heating, and the linear memory structure 160 rapidly cools down. When the temperature drops below 45 degrees, the linear memory structure 160 changes from a curved shape back to a straight strip-like structure and is regularly arranged to form the oriented slit, thereby restoring the function of the polarizer.

Take the linear memory structure 160 made of titanium-nickel-copper alloy as an example. The titanium-nickel-copper is placed in a high temperature furnace of 1000~1300° C. and melted into a liquid state, and then poured into a mold with multiple S-shaped grooves. At this time, the shape of the linear memory structure 160 is the shape of the de-oriented state. When the temperature is 800° C.~1000° C., the titanium-nickel-copper is in a solidified state, but it can be deformed by the action of a slight external force. Quickly place the mold in ice water at 0° C.~5° C., and quickly convert the S-shaped mold groove into a straight groove. Through rapid cooling and shaping, the linear memory structure 160 remembers the shape before cooling. That is, it maintains a linear state at room temperature below 40° C., and when heated to above 45° C., it will restore the S-type, and when the temperature again drops below 40° C., it will transform into a linear, that is, a regularly arranged oriented structure. After the transparent electrothermal film 174 is cured into a film, tiny fixing grooves 175 are prepared on the surface of the transparent electrothermal film 174 to fix the shape memory unit. The linear memory structure 160 is transfer-printed onto the transparent electrothermal film, and fixed in the fixing groove 175 by pressing.

The heating structure 171 on the first polarizer 110 and the heating structure 171 on the second polarizer 130 are arranged in series to ensure the temperature consistency between the linear memory structure 160 on the first polarizer 110 and the linear memory structure 160 on the second polarizer 130, so that the synchronization of forming the oriented slit and releasing the oriented slit is ensured.

Of course, the orientation release structure 170 further includes an electromagnet structure 180, and the linear memory structure 160 is oriented by generating a magnetic field through the electromagnet structure. When the camera 140 needs to be used, the electromagnet structure 180 is powered off to control the electromagnet structure 180 not to generate a magnetic field, and the linear memory structure 160 returns to a disorderly arrangement state, that is, a non-oriented state, which is equivalent to the above-mentioned release of the oriented slit, thereby releasing the polarization function of the corresponding linear memory structure 160 so as to increase the light transmittance and realize the normal use of the under-screen camera 140. When the camera 140 does not need to be used, the electromagnet structure 180 is energized, the electromagnet structure 180 generates a magnetic field, and the linear memory structure 160 is regularly arranged to form the oriented slit. The material of the linear memory structure 160 includes iron, nickel, iron-cobalt alloy, soft ferrite, iron-aluminum alloy, and the like.

Figure 6:
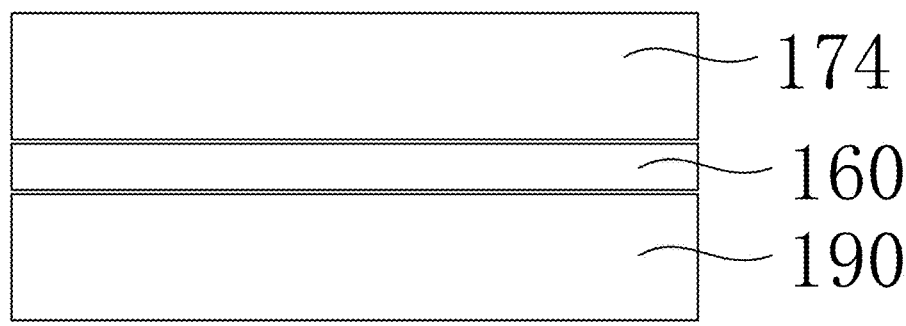
FIG. 6 is a schematic diagram of a display device further including a heat insulating film according to an embodiment of the present application.

As shown in FIG. 6, the display device 10 further includes a heat insulating film 190. The heat insulating film 190 is disposed on a side of the linear memory structure 160 away from the orientation release structure 170. The heat insulating film 190 is arranged in the second polarizer 130 on the side of the linear memory structure 160 adjacent to the backlight module 150, so as to prevent the heat generated by the backlight module 150 from causing the linear memory structure 160 to release the oriented slit. The insulating film 190 is arranged in the first polarizer 110 on the side of the linear memory structure 160 adjacent to the display panel 120 to prevent the heat generated by the heating structure 171 from being conducted to the filter layer of the display panel 120 and prevent the filter layer from generating gas and water vapor, which would otherwise cause the filter layer swell causing the film to be uneven, thereby affecting the display effect.

Figure 7:
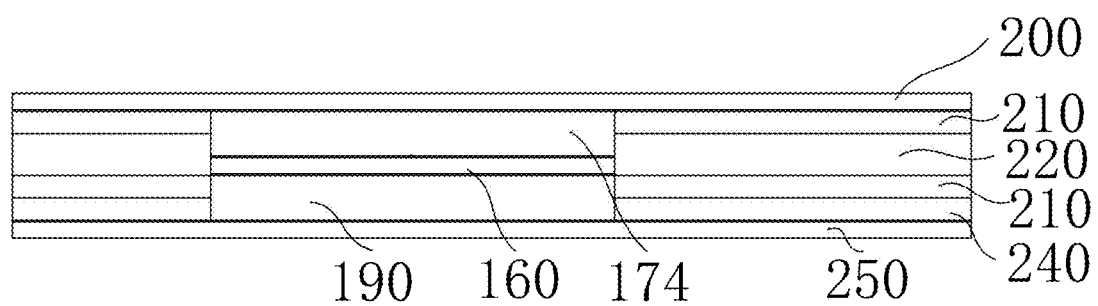
FIG. 7 is a schematic diagram of a linear memory structure and an orientation release structure arranged in a light admission hole according to an embodiment of the present application.

As shown in FIG. 7, the linear memory structure 160 and the orientation release structure 170 are arranged in the light admission hole 111. Taking the first polarizer 110 as an example, the polarizer includes a protective layer 200, a TAC (triacetate cellulose) layer 210, a PVA (polyvinyl alcohol) layer 220, a TAC layer 210, and a PSA (pressure sensitive adhesive) layer 240, a PET (release layer) layer 250, and the light admission hole 111 which are stacked. The light admission hole 111 penetrates the TAC layer 210, the PVA layer 220, the TAC layer 210 and the PSA layer 240. The linear memory structure 160 and the orientation release structure 170 are arranged in the light admission hole 111. The transparent electrothermal film 174 is arranged on the side of the linear memory structure 160 away from the PET layer 250. The insulating film 190 is disposed on the side of the linear memory structure 160 away from the protective layer 200. The transparent electrothermal film 174, the linear memory structure 160 and the heat insulating film 190 are stacked, and the total thickness is equal to the depth of the light admission hole 111, which ensures the flatness of the polarizer film layer.

The technical solutions of the present application may be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, the above solutions are also applicable to other types of display panels, such as OLED (Organic Light-Emitting Diode) display panels.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A display device, comprising a display panel, a first polarizer, and a second polarizer; wherein the first polarizer is arranged on a side of a light-emitting surface of the display panel, and the second polarizer is arranged on a side of a light-incident surface of the display panel; wherein a light admission hole is defined in at least one of the first polarizer and the second polarizer and disposed corresponding to a camera;
wherein the display device further comprises at least one orientation release structure and a plurality of linear memory structures, wherein the orientation release structure is disposed corresponding to the light admission hole and is located on a same side of the display panel as the light admission hole, and wherein the plurality of linear memory structures are arranged corresponding to the orientation release structure and correspond to the position of the light admission hole;
wherein when the orientation release structure is in a non-operating state, the plurality of linear memory structures are regularly arranged to form an oriented slit, and wherein when the orientation release structure is in an operating state, the plurality of linear memory structures release the oriented slit;
wherein the light admission hole is defined in the second polarizer, and wherein an oriented state in which the plurality of linear memory structures are regularly arranged to form the oriented slit is consistent with an oriented state of the second polarizer.

2. The display device of claim 1, wherein an orthographic projection area of the light admission hole is greater than an orthographic projection area of the camera, and a ratio of the orthographic projection area of the light admission hole to the orthographic projection area of the camera is: 1:1.2.

3. The display device of claim 1, wherein an orthographic projection area of the light admission hole is equal to an orthographic projection area of the camera.

4. The display device of claim 1, wherein the light admission hole is defined in the first polarizer, and wherein an oriented state in which the plurality of linear memory structures are regularly arranged to form the oriented slit is consistent with an oriented state of the first polarizer.

5. The display device of claim 1, wherein the orientation release structure and the linear memory structures are stacked in the light admission hole, and wherein a sum of a thickness of the orientation release structure and a thickness of the linear memory structures is equal to a thickness of the light admission hole.

6. The display device of claim 1, wherein taking a depth direction of the light admission hole as a first direction, the plurality of linear memory structures and the orientation release structure are disposed on an extending direction of the light admission hole in the first direction.

7. The display device of claim 1, wherein the light admission hole is defined in each of the first polarizer and the second polarizer, wherein the light admission hole in the first polarizer and the light admission hole in the second polarizer are correspondingly and oppositely arranged;
wherein the display device comprises two of the orientation release structures; wherein one of the orientation release structures is arranged on the side of the display panel away from the first polarizer, and is arranged corresponding to the light admission hole in the second polarizer; the other one of the orientation release structures is arranged on the side of the display panel away from the second polarizer, and is arranged corresponding to the light admission hole in the first polarizer;
wherein when the two orientation release structures are not in operation, the oriented slit formed by the regular arrangement of the linear memory structures disposed on the side of the display panel away from the second polarizer is perpendicular to the oriented slit formed by the regular arrangement of the linear memory structures on the side of the display panel away from the first polarizer.

8. The display device of claim 7, wherein the oriented state of the oriented slit formed by the regular arrangement of the linear memory structures disposed on the side of the display panel away from the second polarizer is consistent with the oriented state of the first polarizer;
wherein the oriented state of the oriented slit formed by the regular arrangement of the linear memory structures disposed on the side of the display panel away from the first polarizer is consistent with the oriented state of the second polarizer.

9. The display device of claim 1, wherein the orientation release structure comprises a transparent electrothermal film, and a first electrode and a second electrode that are arranged opposite to each other and surround the transparent electrothermal film in a circumferential direction, and wherein the linear memory structure is arranged on a surface of the transparent electrothermal film;
wherein the first electrode and the second electrode are operative to heat the linear memory structures through the transparent electrothermal film, and the linear memory structures accordingly are operative to bend to release the oriented slit.

10. The display device of claim 9, wherein a material of the transparent electrothermal film comprises at least one material selected from the group consisting of polyethylene terephthalate, transparent graphene film, and polycarbonate.

11. The display device of claim 9, wherein the surface of the transparent electrothermal film comprises a plurality of fixing grooves, and the linear memory structures are respectively arranged in the fixing grooves.

12. The display device of claim 11, wherein a material of the plurality of fixing grooves is identical with the material of the transparent electrothermal film.

13. The display device of claim 9, wherein the polarizer comprises a protective layer, a triacetate cellulose layer, a polyvinyl alcohol layer, a triacetate cellulose layer, a pressure sensitive adhesive layer, and a release layer, which are stacked; wherein the light admission hole penetrates the triacetate cellulose layer, the polyvinyl alcohol layer, the triacetate cellulose layer, the pressure sensitive adhesive layer, and the release layer;
wherein the plurality of linear memory structures and the orientation release structure are arranged in the light admission hole;
wherein the transparent electrothermal film is arranged on a side of the plurality of linear memory structures away from the release layer;
wherein the transparent electrothermal film, the linear memory structures and the heat insulating film are stacked, and a total thickness of the transparent electrothermal film, the linear memory structures, and the heat insulating film is equal to a depth of the light admission hole.

14. The display device of claim 1, wherein the orientation release structure further comprises a plurality of electromagnet structures and a transparent electrothermal film, wherein the plurality of electromagnet structures are oppositely disposed and circumferentially surround the transparent electrothermal film, and wherein the plurality of linear memory structures are arranged on a surface of the transparent electrothermal film;
wherein when the plurality of electromagnet structures are energized to generate a magnetic field, the plurality of linear memory structures are regularly arranged to form the oriented slit;
wherein when the plurality of electromagnet structures are powered off and does not generate a magnetic field, the plurality of linear memory structures return to the non-oriented state.

15. The display device of claim 1, further comprising a heat insulation film disposed on a side of the linear memory structure away from the orientation release structure.

16. The display device of claim 1, wherein the linear memory structure is made of at least one material selected from titanium-nickel-copper alloy, titanium-nickel-iron alloy, titanium-nickel-chromium alloy, nickel-aluminum alloy, iron-manganese-silicon alloy, and copper-zinc alloy.

17. A display device comprising a display panel, a first polarizer, and a second polarizer; wherein the first polarizer is arranged on a side of a light-emitting surface of the display panel, and the second polarizer is arranged on a side of a light-incident surface of the display panel; wherein a light admission hole is defined in each of the first polarizer and the second polarizer and disposed corresponding to a camera; wherein the light admission hole defined in the first polarizer is disposed corresponding to the light admission hole defined in the second polarizer;
wherein the display device further comprises two orientation release structures and a plurality of linear memory structures, wherein one of the two orientation release structures is disposed in the light admission hole defined in the second polarizer, and the other one of the two orientation release structures is disposed in the light admission hole defined in the first polarizer;
wherein a sum of a thickness of the orientation release structures and a thickness of the plurality of linear memory structures is equal to a thickness of the respective light admission hole;
wherein when the two orientation release structures are in a non-operating state, an oriented slit formed by the regular arrangement of the linear memory structures disposed on the second polarizer is perpendicular to an oriented slit formed by the regular arrangement of the linear memory structures on the first polarizer;
wherein each orientation release structure comprises a transparent electrothermal film, and a first electrode and a second electrode that are arranged opposite to each other and surround the transparent electrothermal film in a circumferential direction, and wherein the linear memory structure is arranged on a surface of the transparent electrothermal film; wherein the surface of the transparent electrothermal film comprises a plurality of fixing grooves, and the linear memory structures are respectively arranged in the fixing grooves; wherein the first electrode and the second electrode are operative to heat the linear memory structures through the transparent electrothermal film, and the linear memory structures accordingly are operative to bend to release the oriented slit;
wherein the display device further comprises a heat insulation film disposed on a side of the linear memory structure away from the orientation release structure;
wherein the linear memory structure is made of at least one material selected from titanium-nickel-copper alloy, titanium-nickel-iron alloy, titanium-nickel-chromium alloy, nickel-aluminum alloy, iron-manganese-silicon alloy, and copper-zinc alloy.

18. An electronic device, comprising a camera and a display device, wherein the camera is arranged corresponding to a light admission hole in the display device; wherein the display device comprises a display panel, a first polarizer, and a second polarizer; wherein the first polarizer is arranged on a side of a light-emitting surface of the display panel, and the second polarizer is arranged on a side of a light-incident surface of the display panel; wherein a light admission hole is defined in at least one of the first polarizer and the second polarizer and disposed corresponding to the camera;
wherein the display device further comprises at least one orientation release structure and a plurality of linear memory structures, wherein the orientation release structure is disposed corresponding to the light admission hole and is located on a same side of the display panel as the light admission hole, and wherein the plurality of linear memory structures are arranged corresponding to the orientation release structure and correspond to the position of the light admission hole;
wherein when the orientation release structure is in a non-operating state, the plurality of linear memory structures are regularly arranged to form an oriented slit, and wherein when the orientation release structure is in an operating state, the plurality of linear memory structures release the oriented slit;

wherein the light admission hole is defined in the second polarizer, and wherein an oriented state in which the plurality of linear memory structures are regularly arranged to form the oriented slit is consistent with an oriented state of the second polarizer.

* * * * *